Nov. 5, 1968 M. A. ODOM 3,409,741

TELEPHONE CALL DIVERTER CONTROL CIRCUIT

Filed June 8, 1964 2 Sheets-Sheet 1

INVENTOR.
MARTIN A. ODOM

BY William D. Hager

ATTORNEY

INVENTOR.
MARTIN A. ODOM
BY William D. Hager

United States Patent Office 3,409,741
Patented Nov. 5, 1968

3,409,741

TELEPHONE CALL DIVERTER CONTROL CIRCUIT

Martin A. Odom, Oakland, Calif., assignor to Marcom, Inc., a corporation of California Filed June 8, 1964, Ser. No. 373,263
20 Claims. (Cl. 179—18)

ABSTRACT OF THE DISCLOSURE

Described herein are an improved supervisory circuit and dial apparatus for use with a call diverter of the type which automatically transfers an incoming call to a preselected remote number. At variance with prior art systems, the circuits herein provide for coupling and decoupling of the calling and called lines by detecting an "answer" and "call termination" independently of "on and off hook" pulses. Particularly, an "answer" by the remote number is sensed by monitoring the cessation of "ring back" signals, while a termination of the forwarded call is detected by periodically momentarily opening one of the lines which will induce an open line signal from central office, e.g., dial tone, when, but only when, the call has been terminated and then sensing such open line signal to effect decoupling of the lines. In general, the subject matter herein deals with advances over the systems disclosed in Patent Nos. 3,268,666 and 3,301,961.

Figures 1, 3:
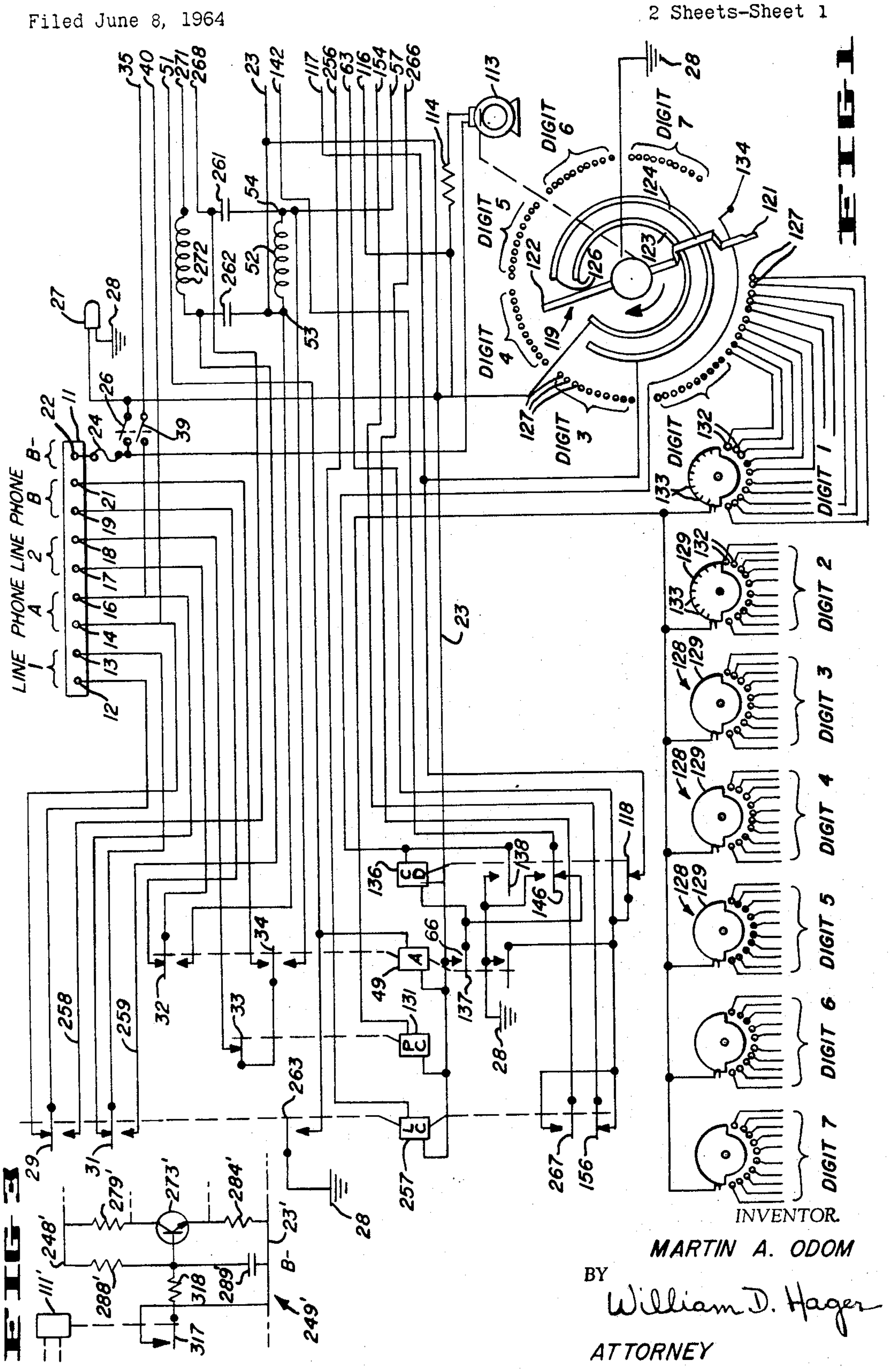

The present invention relates to telephone equipment and more particularly to a more reliable and error-free supervisory circuit for controlling the operation of a call diverter of the type which automatically transfers an incoming call at a subscriber's set, or the like, to any pre-selected remote number.

A call diverter, which may readily be connected to a standard telephone set, functions to detect an incoming ringing signal and to dial any preselected distant telephone number over a second service line. The diverter automatically detects when the distant telephone has been answered and then couples the first service line to the second so that the call may be received at the distant telephone rather than at the telephone which was originally called. The ability to dial a distant preselected number automatically makes the apparatus adaptable to several other highly useful purposes in addition to call diversion. The unit may, for example, be connected to any of various types of alarm system on the premises at which a telephone is situated and will automatically call a predetermined telephone number if the alarm is tripped. Furthermore, the apparatus may be installed at the central office for the general use of re-routing calls.

Call diverters of this type have been found to be extremely useful by a variety of telephone subscribers. Subscribers such as doctors, attorneys, business executives and the like are enabled to receive office calls at home or while visiting other premises. In many instances the low cost unit allows a professional subscriber to dispense with answering services, recorder answering devices and the like. The unit has considerable advantages for ordinary home telephone subscribers in that calls may be received at any selected number when the subscriber leaves the home.

The mechanical and electrical construction of a call diverter of this general type is disclosed in Patent 3,268,666. The apparatus of Patent 3,268,666 includes, in conjunction with control circuitry, a conventional telephone dial mechanism together with a largely mechanical system for operating the dial to call the remote number to which calls are to be forwarded.

Patent No. 3,301,961 discloses an alternate form of call diverter which is less complex from the mechanical standpoint in that a specialized rotary switch and electrical controls replace the conventional dial and drive mechanism therefor.

The present invention utilizes a rotary switch dialing system of the general type disclosed in Patent No. 3,301,961 together with highly advantageous novel circuitry for controlling the switch and for performing such functions as detecting incoming calls, detecting when the remote telephone has been answered and detecting when the remote telephone connection has been terminated. Reliability in performing these functions is extremely important in order to avoid such malfunctions as failure to initiate or complete the forwarding of a call, premature termination of the connection, or failure to re-set for forwarding a subsequent call.

Following dialing of the remote number, prior call diverters have detected an answer, and the later termination of the call, by detecting the loud sharp click which is generated when the receiver of the called telephone is picked up or replaced. In electrical terms, the prior call diverters must reliably discriminate between the off-hook and on-hook pulses as against the voice signals, random noise etc. which is generally always present. Owing to the relatively large amplitude of the hook pulses, a pulse discriminator provides a workable means of achieving the desired result. It is evident however that the possibility of error is present and that a more positive call monitoring means is desirable.

The present invention provides a very reliable call monitoring action by eliminating any dependency on the detection of on-hook and off-hook pulses. In particular, to determine when the remote telephone to which an incoming call is to be diverted has been answered, the ring back signal which arises from ringing of the remote telephone is detected and caused to periodically trip a multivibrator or other circuit of the type having two different conditions. When the multivibrator or the like ceases to periodically switch between alternate conditions, indicating that the remote telephone has been answered, a relay operates to connect the incoming call thereto.

Considering now the novel means by which the diverter detects when the call has been terminated, a search timer circuit is provided which periodically opens one of the lines very briefly during the course of the conversation without disturbing the audio signal connection. The diverter is then able to detect if central office dial tone is returned indicating that the call has been terminated. Upon the detection of dial tone, relays are actuated to re-set the diverter for forwarding a subsequent call.

Accordingly it is an object of this invention to provide a more dependeable and error free apparatus for automatically forwarding incoming calls from an associated subscribers telephone set to a preselected distant telephone number.

In particular, it is an object of this invention to provide more reliable supervisory circuitry for an automatic telephone call diverter.

It is a further object of the invention to prevent malfunctioning of an automatic telephone call diverter due to misinterpretation of the various signals and pulses which may be present on the associated telephone lines.

It is another object of the invention to eliminate the need for detection of hook pulses in a telephone call forwarding apparatus.

It is another object of the invention to provide improved means for detecting an answered and a completed condition of a forwarded call in a telephone call diverter.

It is still another object of the invention to provide an automatic telephone call diverter having means for making a positive determination of the termination of a forwarded call.

Figure 2:
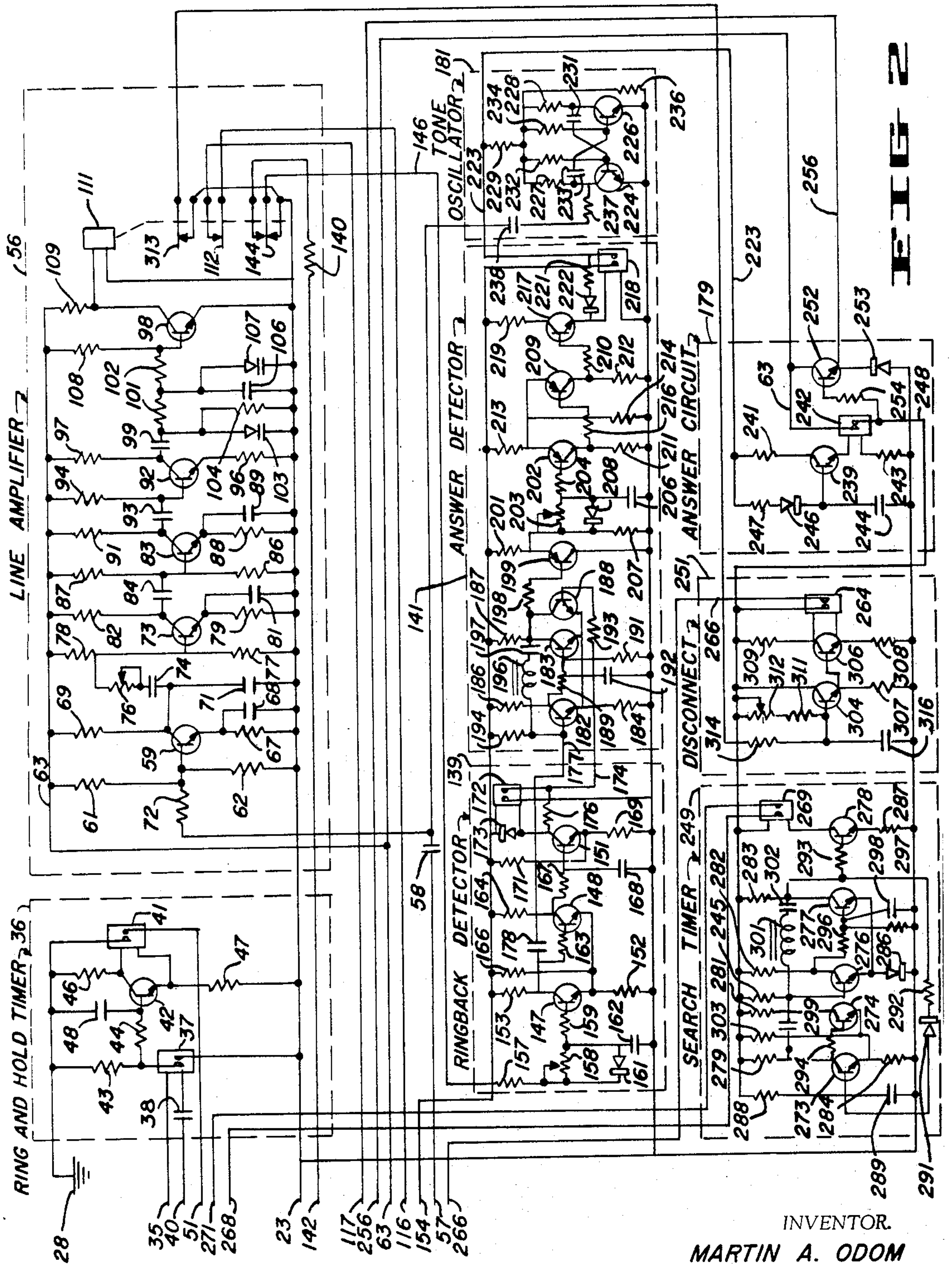

The invention, together with further objects and advantages thereof, will best be understood by reference to the following specification and the accompanying drawings of which:

FIGURE 1 is a schematic diagram showing a first portion of the electrical circuit of a call diverter embodying the invention, FIGURE 2 is a continuation of FIGURE 1 showing additional circuitry of the call diverter, certain of the conductors at the left side of FIGURE 2 being continuous with the correspondingly numbered conductors at the right side of FIGURE 1, and FIGURE 3 shows a modified form of a portion of the circuit of FIGURE 2.

The particular embodiment of the invention to be herein described is adapted for use at a subscriber's installation which includes two service lines to the central exchange and two telephone instruments, both of which may be used to transmit and receive calls in the normal manner when the diverter is not operating. It will be apparent that the apparatus is equally applicable to installations having a single telephone instrument although two service lines are still required.

Referring now to the drawing there is shown a terminal strip 11 mounting the terminal posts needed for connecting the diverter to the subscriber's telephone installation. Included on strip 11 are terminals 12 and 13 for connection to the T and R side respectively of the first service line, terminals 14 and 16 for connection to the first telephone instrument, terminals 17 and 18 for connection to the T and R side respectively of the second service line, and terminals 19 and 21 for connection to the second telephone instrument.

Also included on strip 11 is a B— terminal 22 for connection to a source of direct current, minus twenty four volts in this instance, which may variously be a battery or a rectified coupled to AC utility lines. Terminal 22 is connected to a B— bus line 23 through a fuse 24 and primary control switch 26. To give a visual indication when the diverter is on, a pilot light 27 is connected between bus line 23 and chassis ground 28.

When the diverter is off, normal usage of both phones is provided for by connection of first service line terminal 12 to phone A terminal 14 through normally closed relay contacts 29, connection of first service line terminal 13 to phone A terminal 16 through normally closed relay contacts 31, connection of line 2 terminal 17 to phone B terminal 19 through normally closed relay contacts 32, and connection of line 2 terminal 18 to phone B terminal 21 through two sets of normally closed relay contacts 33 and 34. The above mentioned relay contacts are opened in the course of call diversion as will hereinafter be described.

To facilitate an understanding of the operation of the diverter, component circuits and elements will be described in the order that such components and elements function in the process of forwarding a call received on line 1 (terminals 12 and 13) and intended for phone A. A first such component circuit is a ring and hold timer 36 (FIGURE 2) which detects the incoming ringing signal and initiates call diversion.

Ring and hold timer 36 includes a normally open relay 37 having the driver coil connected to phone A terminals 14 and 16 through conductors 35 and 40, through a capacitor 38 which prevents the relay coil from shorting line 1, and through a switch 39 ganged with the diverter control switch 26 for simultaneously operation therewith. Ring and hold timer 36 includes a second normally open relay 41 having a transistor 42 connected across the coil thereof.

Resistors 43 and 44, connecting to chassis ground 28, supply base potential to transistor 42. Resistor 46, also connected to ground 28, is the collector load resistance and resistor 47 connects the emitter of transistor 42 with B— conductor 23.

When the diverter is turned on, by closing control switch 26, and there is no incoming ringing signal on line 1, transistor 42 is conducting and the low internal resistance thereof acts as a short across the coil of relay 41 thereby preventing closing of the relay. However when a ringing signal voltage is present on line 1, relay 37 closes at each peak of the ringing voltage owing to the hereinbefore described connections. A capacitor 48 is connected between the base of transistor 42 and ground 28 and thus charges toward B— through resistor 44 when the relay 37 closes. This raises the potential at the base of transistor 42 so that it ceases to conduct.

During the silent period between rings, capacitor 48 discharges through resistors 43 and 44 however constants are such that the period is insufficient to allow the transistor 42 to conduct while the periodic ringing voltage is received. It is noted that a continuous ringing signal or a unidirectional electrical signal will actuate ring and hold timer 36 equally well as the periodic ringing voltage signal.

When transistor 42 is made non-conducting by the ringing signal as described above, the shorted condition of the coil of relay 41 is eliminated. Accordingly, relay 41 closes and remains closed as long as the ringing continues.

To initiate diversion of the incoming call, the closing of relay 41 in turn energizes relay 49 (FIGURE 1), the current path being from B— conductor 23 through the coil of relay 49, through a conductor 51, and through relay 41 contacts to chassis ground 28. Relay 49 operates the hereinbefore described contacts 32 and 34 causing line 2 to be seized by a coil 52 and causing an open line signal such as a dial tone to be received from the central exchange over line 2. For this purpose, terminal 17 of line 2 becomes connected to a first side 53 of the coil 52 through the operated relay contacts 32. Terminal 18 of line 2 becomes connected to the opposite side 54 of the coil 52 through relay contacts 33 and the now operated relay contacts 34. Side 53 of coil 52 is also connected to B— conductor 23 while side 54 of the coil is also connected to the input of line amplifier sub-circuit 56 (FIGURE 2) through a conductor 57 and D.C. isolating capacitor 58.

Line amplifier 56 functions to detect when line 2 has been seized and is open for an outgoing call by detecting the dial tone signal which is then amplified and used to operate a relay that actuates the dialing mechanism.

Line amplifier 56 includes five transistor stages of which the first transistor 59 is a class A amplifier. Bias is supplied to the base of transistor 59 from the juncture between voltage divider resistors 61 and 62 which are connected across B— conductor 23 and a grounding conductor 63. Conductor 63 is connected to chassis ground 28 through normally open relay contacts 66 (FIGURE 1) the contacts being operated by the hereinbefore described relay 49 to complete the ground connection.

An additional resistor 67 connects the emitter of transistor 59 to B— conductor 23, the resistor being bypassed by a capacitor 68 to prevent degeneration, and a load resistor 69 is connected from the collector of transistor 59 to grounding conductor 63. A capacitor 71 is connected between the collector of transistor 59 and B— conductor 23 to bypass random noise which may be present on the line.

The dial tone input signal to the line amplifier 56 is through the hereinbefore described conductor 57 which connects to the base of transistor 59 through a resistor 72.

The collector of transistor 59 is also coupled to the base of a second transistor 73 through a coupling capacitor 74 and gain control variable resistor 76, transistor 73 also being a class A amplifier. Bias is supplied to the base of transistor 73 by a connection to the juncture between two resistors 77 and 78 which are connected across B— conductor 23 and grounding conductor 63. An emitter resistor 79, bypassed by capacitor 81, is connected between transistor 73 and B— conductor 23 and a load resistor 82 is connected from the collector to grounding conductor 63. The collector of transistor 73 is further connected to the base of third stage transistor 83 through a coupling capacitor 84, transistor 83 being a low power amplifier. Resistors 86 and 87 are connected from the base of transistor 83 to B— conductor 23 and grounding conductor 63 respectively to provide bias thereto. An emitter resistor 88, bypassed by capacitor 89, is connected from transistor 83 to B— conductor 23 and a load resistor 91 connects the collector of transistor 83 to grounding conductor 63.

The collector of transistor 83 is in turn coupled to the base of fourth transistor 92 through a capacitor 93, the transistor 92 being maintained normally conducting in the saturation region. Bias is supplied to the base of transistor 92 through a resistor 94 connecting with grounding conductor 63 and a stabilizing resistor 96 connects the emitter of transistor 92 with B— conductor 23. A load resistor 97 is connected between the collector of transistor 92 and grounding conductor 63.

The collector of transistor 92 is coupled to the base of the fifth transistor 98 through a capacitor 99 and two resistors 101 and 102 which are elements of an integrating network. Further elements of the network include a first junction diode 103 coupled from B— conductor 23 to the connection between capacitor 99 and resistor 101, in parallel with a resistor 104, and an additional capacitor 106 connected from B— conductor 23 to the juncture between resistors 101 and 102. A second junction, diode 107 is connected in parallel with capacitor 106 to prevent a reversal of polarity thereof.

Bias is supplied to the base of transistor 98 through a resistor 108 which connects to grounding conductor 63. The emitter of transistor 98 is connected to B— conductor 23 and the collector is connected to grounding conductor 63 through a resistor 109. A relay coil 111 is connected between B— conductor 23 and resistor 109 so that the transistor 98, when conducting, constitutes a short across the coil which prevents the relay from operating.

Under no-signal conditions transistor 98 is conducting and therefore holds the relay coil 111 in an unenergized condition as described above. When dial tone, ring back, audio or any other signal appears at the input 57 to the line amplifier 56, it is amplified by transistors 59, 73 and 83 and applied to the base of transistor 92. The amplified signal at the collector of transistor 92 is rectified by junction diode 103 and filtered by the network comprised of resistors 101 and 102 and capacitor 106. The resulting negative DC voltage is applied to the base of transistor 98 which is then cut off. Thus the short across relay coil 111 is removed and the relay operates to initiate dialing of a preselected distant telephone number.

A first set of normally open contacts 112 are operated by line amplifier relay coil 111 to ground one terminal of a dialing switch drive motor 113 (FIGURE 1), the other motor terminal being connected directly to the B— input terminal 22 through fuse 24. For this purpose the first motor terminal is connected to one side of relay contacts 112 through a protective resistor 114 and a conductor 116 and the opposite side of relay contacts 112 connects to chassis ground 28 through a conductor 117, a set of normally closed relay contacts 118 and the hereinbefore described relay contacts 66 which, at this stage of operation, have been closed by relay 49.

Considering now the structure and operation of the dialing mechanism, with reference primarily to FIGURE 1, drive motor 113 is coupled to turn a rotary electrically conducting wiper arm 119 which is connected to chassis ground 28. The axis of rotation of arm 119 is displaced from the center thereof so that the arm has two oppositely extending ends with a first end 121 being of greater length than the second end 122. Disposed adjacent arm 119, concentrically with respect to the rotary axis thereof, are inner and outer ring conductors 123 and 124 respectively each having a gap 126 at the initial position of the shorter end 122 of arm 119 and with the gap in the outer ring being of slightly greater angular extent than that of the inner ring. The rings 123 and 124 are bridged and electrically connected by the short end 122 of arm 119, as it turns, while the longer end 121 of the arm is arranged to be electrically isolated from the rings.

Inner ring 123 is connected to the positive terminal of drive motor 113 through the motor resistor 114 so that grounding of the motor terminal, which initially occured through the line amplifier relay contacts 112, is maintained through the wiper arm 119. Thus the motor 113 continues to be energized and to turn arm 119 for a complete revolution of the arm, once the motor has been started by the line amplifier output as previously described.

A series of dialing pulse contacts 127 are disposed in a circular array around the axis of rotation of arm 119, the contacts being outward from ring 124 in position to be contacted sequentially by the longer end 121 of arm 119 as it turns. Contacts 127 are divided into angularly spaced groups of ten, the number of groups being equal to the number of digits in the distant telephone number to which the call is to be forwarded. Seven such groups of contacts 127 are employed in the present embodiment in view of the present usage of seven digit numbers in domestic local telephone systems. It will be apparent however that a greater or lesser number of groups may be provided as circumstances dictate. The groups of contacts 127 are distributed around the rotary axis of arm 119 in such a manner that the initial contact 127 to be encountered by the tip 121 of arm 119 is diametrically opposite from the ends of the rings 123 and 124 which are first contacted by the opposite end of the arm and in such a manner that no contacts 127 are present in the region diametrically opposite from the gaps 126 in the rings 123 and 124.

To provide for the preselection of any desired telephone number to receive forwarded calls, seven manually adjustable digit selector switches 128 are provided. Each such switch 128 includes a manually rotatable semi-circular element 129 which is electrically connected to B— conductor 23 through the relay coil 131 that operates the hereinbefore described line 2 relay contacts 33. A semi-circular array of ten contacts 132 is centered on the rotary axis of each adjustable element 129 so that by turning each such element, any selected number of the associated ten contacts 132 may be connected to the B— conductor 23 through relay coil 131.

The ten contacts 132 of each selector switch 128 are individually connected to separate ones of the corresponding group of contacts 127 associated with the rotating wiper arm 119. Thus as the arm 119 rotates around each group of contacts 127, momentarily applying a ground connection to each thereof, line 2 relay contacts 33 are briefly opened a number of times corresponding to a digit of the preselected telephone number which is to receive the forwarded call. The repeated operation of the relay contacts 33 generates the dialing pulses which are transmitted to the central telephone exchange over line 2.

To facilitate manual setting of the digit selector switches 128, indicia marks 133 may be provided to indicate the number of contacts 132 which are electrically connected to each element 129 at any given angular position thereof.

After the rotating arm 119 has swept across all of the dialing pulse contacts 127, end 122 of the arm moves into the gap 126 in inner ring 123 thereby cutting off the energizing current to drive motor 113 and stopping further rotation of the arm. To initiate operation of post-dialing circuitry, a contact 134 is disposed in position to be momentarily grounded by end 121 of the wiper arm 119 just as the motor is de-energized.

Contact 134 connects with B— conductor 23 through a relay coil 136 and normally open relay contacts 137, the contacts 137 being closed at this stage of operation by the hereinbefore described relay coil 49. Thus relay coil 136 is energized momentarily by passage of rotating arm 119 across the contact 134. Coil 136 operates a first set of normally open contacts 138 which ground the connection between the coil and contact 134 thereby locking the coil in an energized condition. Relay coil 136 also opens contacts 118 thereby isolating rings 123 and 124 from ground.

The energization of relay coil 136 following the dialing operation activates a ring back detector sub-circuit 139 (FIGURE 2) which functions to detect the intermittant signal, returned over line 2, that indicates that the distant telephone is receiving an answer command signal such as a ringing signal and then initiates operation of an answer detector sub-circuit 141 (FIGURE 2). The ring back detector 139 must distinguish between the ring back signals and the preceding miscellaneous pulses due to office connections and the like which follow dialing.

To initiate operation of ring back detector 139, relay coil 136 connects a conductor 142 with chassis ground 28 through a set of contacts 146 which, in the unoperated condition, connect the conductor 142 with B— conductor 23. Referring now particularly to FIGURE 2, a set of relay contacts 144, operated by the hereinbefore described line amplifier relay 111, connects conductor 142 with an input conductor 146 of the ring back detector 139 through resistor 140. In the unoperated position, relay contacts 144 couple the ring back detector input 146 to B— conductor 23.

Thus the input 146 to ring back detector 139 is normally at B— potential and remains at such potential when the line amplifier relay 111 operates at any time prior to completion of the dialing operation. However following dialing, operation of the line amplifier relay 111, from incoming line 2 signals of any kind, causes the input to ring back detector 139 to change from B— towards ground potential.

Ring back detector 139 includes first and second transistors 147 and 148 respectively which are components of a trigger circuit and a third transistor 151 which controls a relay 172. An emitter resistor 152 connects transistor 147 to B— conductor 23 and a collector resistor 153 connects the transistor to a grounding conductor 154. Conductor 154 in turn connects to chassis ground 28 through a set of normally closed relay contacts 156 (FIGURE 1) and the hereinbefore described contacts 66 which have been closed at the present stage of operation.

Ring back detector input conductor 146 connects to the base of transistor 147 through a first resistor 157, a variable resistor 158 and a bias resistor 159, the variable resistor being paralleled by a diode 161. A capacitor 162 is connected between B— conductor 23 and the juncture between variable resistor 158 and resistor 159.

The base of second transistor 148 is connected to the collector of first transistor 147 through a bias resistor 163 and the collector of the transistor is connected to grounding conductor 154 through resistor 164. The emitter of transistor 148 is connected to B— conductor 23 through the emitter resistor 152 of the first transistor and is further connected to grounding conductor 154 through an additional resistor 166. Thus the resistors 152 and 166 form a voltage divider which holds the emitters of both transistors 147 and 148 at a substantially constant voltage.

The base of the third transistor 151 is coupled to the collector of transistor 148 through resistor 167 and to B— through a capacitor 168. The emitter of transistor 151 connects to B— conductor 23 through a resistor 169 and to grounding conductor 154 through a resistor 171 so that a second voltage divider is formed. The collector of transistor 151 connects to grounding conductor 154 through the driver coil of the normally open relay 172, the coil being bypassed by a diode 173 which prevents inductive voltage pulses from the coil from damaging transistor 151. The contacts of relay 172 connect B— conductor 23 to an answer detector input conductor 174 which is also connected to the collector of transistor 151 through resistor 176.

Considering now the operation of the ring back detector 139, in the absence of incoming signals on line 2 line amplifier relay contacts 144 apply B— potential to input resistor 157 and thus to the first trigger transistor 147 as previously described. Accordingly first transistor 147 is cut off causing ground potential to be present at the base of the second transistor 148 which is therefore conducting. The conducting condition of second transistor 148 in turn holds the base relay control transistor 151 at a lower voltage than the emitter thereof so that the transistor is cut off and relay 172 is unoperated.

When line amplifier relay 111 is operated by incoming signals on line 2, contacts 144 apply ground to the input 146 of the ring back detector 139. At such times capacitor 162 begins to charge through variable resistor 158 thereby making the potential at the base of first trigger transistor 147 more positive. If the line amplifier relay 111 is operated for only a short time, by office connection pulses or other extraneous signals, B— potential is promptly reapplied to the ring back detector input 146 and capacitor 162 discharges through diode 161, thus permitting rapid discharge of capacitor 162 due to the bypassing of variable resistor 158. Thus a short period of operation of the line amplifier relay 111 will not charge the capacitor 162 sufficiently to bring transistor 147 into a conducting state so that, in effect, the ring back detector 139 disregards office connection pulses and the like.

When the first ring back signal is received and line amplifier relay 111 is operated for a longer period of time, capacitor 162 charges to the point where transistor 147 begins to conduct. The trigger circuit then switches to the alternate condition with transistor 147 conducting and the second transistor 148 cut off. When transistor 148 is cut off, the collector voltage thereat approaches ground potential causing the relay control transistor 151 to conduct. By conducting, transistor 151 operates relay 172 which locks in the closed position owing to the transistor bypassing resistor 176. Operation of relay 172 applies B— potential to the first answer detector input conductor 174.

At the end of the ring back signal, line amplifier relay 111 releases and capacitor 162 discharges which cuts off first trigger transistor 147. Thus the trigger circuit reverts to the initial condition with transistor 147 cut off and transistor 148 conducting. The foregoing sequence of operation is repeated with each succeeding ring back signal except that the relay 172 remains operated following the initial ring back signal and continuously applies B— potential to the first answer detector input 174. A second answer detector input conductor 177 connects to the collector of transistor 147 through a coupling capacitor 178 so that each time the ring back detector trigger circuit switches condition a negative pulse is delivered to the answer detector.

The answer detector 141 functions to detect when ring back signals cease, indicating that the distant telephone has been answered, in order to activate an answer circuit 179 and tone oscillator 181. Answer detector 141 includes first and second transistors 182 and 183, having a common emitter resistor 184 and collector resistors 186 and 187 respectively that connect to grounding conductor 154, which are elements of a one-shot multivibrator. A third disabling transistor 188 has an emitter connected to the emitter of transistor 183 and a collector connected to the collector thereof. The base of second transistor 183 connects to the collector of first transistor 182 through a resistor 189 and to B— conductor 23 through a resistor 191 and paralleled capacitor 192.

The first answer detector input conductor 174 connects to the base of disabling transistor 188 through a resistor 193 and the second input conductor 177, receiving the periodic negative pulses arising from ring back signals, connects to the base of first multivibrator transistor 182. The base of first transistor 182 also connects to grounding conductor 154 through resistor 194 and is coupled to the collector of transistor 183 through an inductance 196 and capacitor 197.

The collector of transistor 183 connects through a resistor 198 to the base of a fourth transistor 199 which controls the input to a timing network, the collector of transistor 199 being connected directly to B— conductor 23 and the emitter thereof being connected to grounding conductor 154 through resistor 201. The emitter of transistor 199 is connected to the base of a first trigger circuit transistor 202 through a variable resistor 203 and bias resistor 204. Further elements of the timing network include a capacitor 206 connected from B— conductor 23 to the juncture between resistors 203 and 204, a resistor 207 connected from the emitter of transistor 199 to the B— conductor and a diode 208 connected in parallel with variable resistor 203.

The first trigger transistor 202 and second trigger transistor 209 have collector resistors 211 and 212 respectively which are connected to B— conductor 23 and have a common emitter resistor 213 connecting to grounding conductor 154. An additional resistor 214 connects the emitters of transistors 202 and 203 to B— conductor 23 and the collector of transistor 202 is connected to the base of transistor 203 through resistor 216.

The collector of the second trigger transistor 209 is connected through a resistor 210 to the base of a final transistor 217 that controls the answer detector output relay 218, the emitter of transistor 217 being connected to B— conductor 23 through the coil of the relay so that the relay is operated when the transistor conducts. Additional elements include a collector resistor 219 connected from transistor 217 to grounding conductor 154 and a resistor 221 and diode 222 connecting the grounding conductor to the tone oscillator 181 side of the contacts of relay 218 so that the relay is held closed through its own contacts once it operates.

The contacts of relay 218, which are normally open, operate to connect the grounding conductor 154 with a conductor 223 that applies ground potential to the tone oscillator 181 and answer circuit 179.

Considering now the operation of the answer detector 141, in the absence of incoming line 2 ring back signals the one-shot multivibrator formed by transistors 182 and 183 remains in its stable state with transistor 182 conducting and transistor 183 cut off. As long as transistor 188 is conducting, transistor 183 is shorted and the multivibrator is prevented from switching. Thus transistor 199 is maintained in the conducting condition and in turn prevents capacitor 206 from charging. This holds the first trigger transistor 202 conducting and the second trigger transistor 209 cut off. With transistor 209 cut off, the relay control transistor 217 is also cut off so that relay 218 is unoperated.

When the ring back detector 139 operates as previously described, B— potential is applied to the base of disabling transistor 188 through the first answer detector input 174. Transistor 188 is thereby cut off removing the short from multivibrator transistor 183. At the same time a negative pulse is applied to the base of transistor 182, through the second input 177 from the ring back detector 139, causing the multivibrator to switch to its unstable state with transistor 182 cut off and transistor 183 conducting. This holds transistor 199 in a conducting condition and prevents capacitor 206 from charging. The multivibrator remains in the unstable state for a period of time determined by the values of capacitor 197 and resistor 194, typically of the order of one half second, and then switches back to the initial state with transistor 182 conducting and transistor 183 cut off. When transistor 183 is cut off ground potential is applied to the base of transistor 199 which is then also cut off. Thus capacitor 206 is enabled to charge through resistors 201 and 203.

If the distant telephone has not yet been answered the next ring back signal causes ring back detector 139 to apply another negative pulse to answer detector input 177 and the multivibrator again switches to its unstable state. This brings transistor 199 back to a conducting condition so that capacitor 206 is enabled to discharge through transistor 199 and diode 218 before it has charged sufficiently to cause trigger transistor 202 to conduct. The multivibrator then switches back to the stable state and capacitor 206 again commenses to charge.

As long as ring back signals continue to be received, the foregoing sequence of operations is repeated and the first trigger transistor 202 remains conducting.

When the distant telephone has been answered, ring back stops and thus periodic negative pulses are no longer applied to the answer detector input 177. The multivibrator ceases to switch to the unstable state thereby enabling capacitor 206 to charge to the point where trigger transistor 202 is cut off. The trigger circuit formed in part of transistors 202 and 209 then switches so that transistor 209 becomes conducting and applies forward bias voltage to the base of the relay control transistor 217. Relay transistor 217 then conducts and operates the relay 218 wihch locks closed owing to the connection to B— conductor 23 through resistor 221 and diode 222.

The closing of answer detector relay 218 applies ground potential to the grounding conductor 223 of the tone oscillator 181 and answer circuit 179. The purpose of tone oscillator 181 is to generate an audible signal to inform the party answering the distant telephone that the call is being relayed through the call diverter rather than being received directly at the distant telephone.

The tone oscillator 181 is a standard free-running multivibrator with constants that cause it to operate at a suitable frequency in the audio range, at two kilocycles for example, and includes two transistors 224 and 226 each having the emitter connected directly to B— conductor 23 and having collector resistors 227 and 228 respectively which connect with the grounding conductor 223 through a single additional resistor 229. The base of transistor 224 is connected to the collector of transistor 226 through a capacitor 231 and to the negative side of resistor 229 through a resistor 232. The base of transistor 226 connects to the collector of transistor 224 through a capacitor 233 and to the negative side of resistor 229 through a resistor 234. A resistor 236 connects the negative side of resistor 229 to B— conductor 23.

Thus when ground is applied to the tone oscillator 181 by the answer detector 141 through conductor 223, the multivibrator circuit functions in the conventional manner to generate a continuing signal which is applied to the hereinbefore described terminating coil 52 (FIGURE 1) of line 2 through a resistor 237, coupling capacitor 238 and the hereinbefore described capacitor 58 and conductor 57.

The application of ground potential to conductor 223 by answer detector relay 218 also actuates answer circuit 179 which functions to disconnect ring back detector 139, answer detector 141 and tone oscillator 181 and couples line 1 to line 2 so that the call may proceed.

Answer circuit 179 includes a first transistor 239 having the collector connected to grounding conductor 223 through a resistor 241 and the emitter connected to B— conductor 23 through the driver coil of a normally open relay 242 and a resistor 243. The base of transistor 239 is connected to B— conductor 23 through a capacitor 244 and to grounding conductor 223 through diode 246 and resistor 247. The contacts of relay 242, upon being closed, connect the previously described line amplifier grounding conductor 63 with a conductor 248 that applies ground potential to a search timer sub-circuit 249 and disconnect circuit 251.

Answer circuit 179 includes a second transistor 252 having the collector connected to grounding conductor 63 and the emitter connected to B— conductor 23 through a diode 253. The base of transistor 252 connects to grounding conductor 248 through bias resistor 254. The emitter of transistor 252 is also connected to B— conductor 23 through a conductor 256 and the relay coil 257 (FIGURE 1) that operates the previously described contacts 29, 31, 28 and 156.

When ground potential is applied to answer circuit conductor 223 by the answer detector relay 218, at the same time that tone oscillator 181 is operated, capacitor 244 begins to charge through resistor 247 and diode 246. During the charging period, transistor 239 is cut off and thus relay 242 remains unoperated. After a short period of time, capacitor 244 has charged sufficiently to cause transistor 239 to conduct and relay 242 operates to supply ground potential to the search timer 249 and disconnect circuit 251. Closing of relay 242 also supplies forward bias voltage to the base of transistor 252 which becomes conducting and operates relay 257 (FIGURE 1).

Referring now to FIGURE 1 in particular, energizing of relay 257 operates the previously described contacts 29 and 31 thereby disconnecting the line 1 terminals 12 and 13 from the first telephone terminals 14 and 16. In the alternate or operated positions, contacts 29 and 31 couple line 1 to line 2 through conductors 258 and 259 which connect to ends 54 and 53 respectively of the line 2 terminating coil 52 through capacitors 261 and 262 respectively. Relay 257 also operates an additional set of contacts 263 which maintain the ground connection to relay 49, originally operated by grounding through the ring and hold timer relay.

Referring now again to FIGURES 1 and 2 in conjunction, operation of the answer circuit relay 242 closes a relay 264 in the disconnect circuit 251, as will hereinafter be described in greater detail, which applies a further ground connection to conductor 248 through an additional conductor 266, and through a set of normally open relay contacts 267 that are operated by relay 257 and through the operated contacts 66 of relay 49. This maintains ground potential on conductor 248 after the original ground connection thereto has been opened.

Operation of the relay 257 as described above opens contacts 156 thereby removing the ground connection from grounding conductors 154 and 223 and inactivating the ring back detector 139, answer detector 141, tone oscillator 181 and answer circuit 179 and restoring the respective relays thereof to the initial open positions. Although relay 242 of answer circuit 179 opens, transistor 252 thereof continues to conduct as ground potential is now supplied to the base thereof through the disconnect circuit relay 264 and conductor 248 as described above. Thus the relay 257 remains operated.

The connections between lines 1 and 2, and thus between the calling party and the called party, are now from terminal 12 through relay contacts 29, through a conductor 268 and the operated contacts of a relay 269 in the search timer circuit 249, through a conductor 271 and line 1 terminating coil 272 and then through operated relay contacts 31 to terminal 13. Line 2 terminal 17 now connects to terminal 18 through operated relay contacts 32, line 2 terminating coil 52, operated relay contacts 34 and the now closed relay contacts 33. Line 1 coil 272 and line 2 coil 52 are coupled, for audio signals, by the capacitors 261 and 262.

Referring now again to FIGURE 2 in particular, the search timer 249 functions to detect when one or both parties have hung up so that the diverter may reset for forwarding a subsequent call. The search timer periodically opens line 1 in the course of the call for a brief period, 0.2 second, for example. Owing to the previously described coupling of the two lines through capacitors 261 and 262, opening of the line does not interfere with the conversation. However if the calling party has hung up dial tone will be returned from the central office whereupon the disconnect circuit 251 is activated.

Certain widely used and well known central office systems do not automatically or immediately return a dial tone to lines 1 or 2 so long as they remain closed even though the forwarded call has been terminated. Without receiving dial tone at the end of the call diversion, the diverter will maintain lines 1 and 2 coupled thus preventing its response to subsequent incoming calls. When the apparatus is utilized with lines from a central office having equipment of one of these last-named types, search timer 249, functions to induce a dial tone from the central office over line 1 after the incoming or calling party hangs up. The dial tone in turn causes restoration of the circuit to its normal rest condition.

The search timer 249 includes five transistors of which transistors 273 and 274 are elements of a trigger circuit, transistors 276 and 277 are elements of a one-shot multivibrator and transistor 278 controls the normally open search timer relay 269.

Transistors 273, 274, 276 and 277 have collector resistors 279, 281, 282 and 283 respectively connecting to grounding conductor 248. Trigger circuit transistors 273 and 274 have a common emitter resistor 284 connected to B— conductor 23 and the emitters of both multivibrator transistors 276 and 277 connect to the B— conductor through a diode 286. A resistor 287 is connected between B— conductor 23 and the emitter of transistor 278 and the collector thereof connects to grounding conductor 248 through the coil of relay 269.

The base of first trigger transistor 273 is connected to grounding conductor 248 through resistor 288, to B— conductor 23 through a capacitor 289 and to the collector of transistor 277 through a diode 291 in series with a resistor 292. The collector of transistor 277 is also connected to the base of relay transistor 278 through bias resistor 293.

The base of second trigger transistor 274 receives bias voltage from the collector of first trigger transistor 273 through a resistor 294 and the base of second multivibrator transistor 277 is connected to the collector of the first multivibrator transistor 276 through resistor 296 and to B— conductor 23 through a resistor 297 and parallel capacitor 298. The base of transistor 276 is connected to grounding conductor 248 through a bais resistor 245. The search timer circuit is completed by a capacitor 299 coupling the base of transistor 276 to the collector of transistor 273 and an inductance 301 and capacitor 302 connected in series between the base of transistor 276 and the collector of transistor 277. A resistor 303 is connected between the emitters of transistors 273 and 274 and grounding conductor 248.

Consideration of the operation of the search timer 249 indicates that when answer circuit 179 applies ground potential to conductor 248, trigger transistor 273 is cut off and transistor 274 is conducting. The one-shot multivibrator is in its stable state with transistor 276 in conduction and transistor 277 cut off. This holds transistor 278 in conduction so that relay 269 is operated to close line 1. Capacitor 289 begins to charge through resistor 288 and eventually brings transistor 273 into conduction so that the trigger switches with the collector voltage of transistor 273 dropping to nearly the same value as the emitter voltage. This supplies a negative pulse through capacitor 299 to the input of the one-shot multivibrator. This cuts off transistor 276 and the multivibrator switches temporarily to its unstable condition.

Upon switching of the multivibrator, transistor 277 becomes conducting thereby cutting off transistor 278 and releasing relay 269. The multivibrator remains in the unstable state for a period, typically 0.2 second, determined by the constants of capacitor 302 and resistor 245. During the period that the multivibrator is in the unstable state, capacitor 289 discharges through diode 291, resistor 292, transistor 277 and diode 286. This removes the bias voltage from first trigger transistor 273 which is then cut off. The circuit is thus returned to the initial condition and the cycle repeats itself.

Thus the net effect of the search timer 249 is to periodically and briefly open line 1, by opening relay 269, in the course of the call. If the calling party has hung up such opening of the line causes dial tone to be returned from the central office which in turn activates the disconnect circuit 251.

The disconnect circuit 251 includes two transistors 304 and 306 having emitter resistors 307 and 308 respectively connecting to B— conductor 23. The collector of transistor 304 connects directly to grounding conductor 248 and the collector of transistor 306 connects thereto through a resistor 309. The base of transistor 304 is connected to grounding conductor 248 through a first resistor 311 and second adjustable resistance 312 and the base of the second transistor 306 connects directly to the emitter of transistor 304. The coil of the previously described disconnect relay 264 is connected across the emitter and collector of transistor 306 so that the transistor, when conducting, acts as a short across the coil and holds the relay unoperated.

A set of normally closed relay contacts 313, operated by the line amplifier relay 111, apply B— potential to the base of transistor 304 through a resistor 314 and a capacitor 316 is connected from the base of transistor 304 to B— conductor 23.

Thus when ground potential has been applied to conductor 248 by the answer circuit 179, the presence of B— potential at the base of transistor 304 holds the transistor cut off. This in turn holds transistor 306 cut off so that relay 264 is operated. However when the line amplifier relay 111 operates, due to the presence of signals on the line, contacts 313 open and remove B— potential from the base of transistor 304. At such times capacitor 316 begins to charge and if the line amplifier relay 111 remains operated for a sufficient period of time the capacitor charges sufficiently to bring transistor 304 into conduction.

In the course of a normal call, the line amplifier relay 111 operates and releases repeatedly, due to the irregular signals resulting from conversation, but does not remain operated long enough to charge capacitor 316 and bring transistor 304 into conduction. However when the search timer 249 opens the line after the calling party has hung up, dial tone is returned from the central office thereby holding the line amplifier relay 111 operated and bringing transistor 304 into conduction.

When transistor 304 conducts, the emitter voltage thereof becomes more positive bringing transistor 306 into conduction. This places a short across the coil of relay 264 causing the relay to open and remove ground potential from the base of answer circuit transistor 252. The transistor 252 is thus cut off de-energizing relay 257 (FIGURE 1).

Referring now again to FIGURE 1 in particular, the release of relay 257 opens contacts 263 which in turn releases relay 49. Contacts 137 open when relay 49 releases and in turn release relay 136 thereby restoring all components of the diverter to the initial condition. Thus the diverter has been readied for forwarding a subsequent call.

Numerous modifications of the described circuitry are possible within the scope of the invention. FIGURE 3, for example, illustrates a modification 249′ of the search timer subcircuit which adapts the subcircuit for searching for dial tone only when there is no conversation on the line. The embodiment hereinbefore described searches periodically irrespective of the presence of audio signals.

Referring now to FIGURE 3, the search timer 249′ is similar in all respects to that previously described except for the addition of elements at the input. Accordingly only the first transistor 273′ is shown together with the associated elements emitter resistor 284′ connecting to B— conductor 23′, collector resistor 279′ connecting to grounding conductor 248′, base bias resistor 288′ connecting to conductor 248′, and a capacitor 289′ coupling the base of transistor 273′ to B— conductor 23′. Each of said elements, as well as the remainder of the search timer, is equivalent to the correspondingly numbered elements of the embodiment of FIGURE 2.

As previously described, the first transistor 273′ of the search timer is initially cut off and the circuit is activated to open line 1 momentarily when the capacitor 289′ has charged sufficiently to apply bias voltage to the base of the transistor and bring it into conduction. In the previous embodiment the capacitor corresponding to capacitor 289′ subsequently discharges and then commences to recharge so that the search process, for bringing in dial tone, is automatically repeated at a fixed interval determined by the circuit constants.

In the embodiment of FIGURE 3 however capacitor 289′ is prevented from charging, and initiating a search, as long as audio signals are present on the line. In particular, B— potential from conductor 23′ is applied to the positive side of the capacitor, and thus to the base of transistor 273′, through a set of normally open relay contacts 317 operated by the line amplifier relay 111′ and through a resistor 318. As has been hereinbefore described, the line amplifier relay 111′ operates repeatedly while there are audio signals present. Thus capacitor 289′ is unable to charge sufficiently to initiate operation of the search timer 249′ during the course of a normal conversation. When the conversation ceases, capacitor 289′ is no longer intermittently connected to B— conductor 23 through contacts 317 and thus is enabled to charge to the required potential for initiating a search.

Similarly, others of the described components may be replaced with equivalent systems. The invention may employ a dialing mechanism of the type described in the hereinbefore identified Patent 3,268,666 or may utilize a multi-frequency system for dialing.

While the invention has been described with reference to usage at a subscriber's telephone installation, it will be appreciated that one or more units of the apparatus may readily be adapted for use at a telephone central office or exchange to perform a similar call forwarding function.

Thus while the invention has been described primarily with reference to a single embodiment it will be appreciated that many variations are possible and it is not intended to limit the invention except as defined in the following claims.

What is claimed is:

1. In an automatic call forwarding apparatus for a telephone installation, the combination comprising:

(a) an incoming ringing signal detector adapted for connection to a first central office line, (b) a dialing pulse generator adapted for connection to a second central office line and having actuating means operated by said ringing signal detector whereby a pre-determined distant number is dialed over said second line, (c) switching circuitry adapted for connection to and for coupling said first line to said second line following operation of said dialing pulse generator, whereby an incoming call over said first line may be received at said pre-determined distant number, (d) a line searching circuit having a switch adapted for connection into said first line and means opening said switch at intervals after said lines have been coupled whereby dial tone will be returned from central office if the call has been completed, and (e) a dial tone detector adapted for connection to said lines and having an output operating said switching circuitry to decouple said lines upon detecting dial tone following operation of said line searching circuit.

2. In an automatic call forwarding apparatus as described in claim 1, the further combination of a ringback detector adapted for connection to said second line detecting the ringback signals which are returned over said second line after said distant number has been called thereon, said ringback detector having an output means controling operation of said switching circuitry (c) to initiate operation thereof only after said ringback signals have ceased.

3. In an automatic call forwarding apparatus as described in claim 1, the further combination comprising first and second terminating coils adapted for connection across said first and second lines respectively and first and second capacitors adapted for coupling opposite ends of said first and second lines wherein operation of said searching circuit (d) opens said first line by disconnecting said first coil therefrom whereby transmission of audio signals between said lines is not stopped by said operation.

4. An automatic call forwarding apparatus as described in claim 1, and wherein said line searching circuit (d) is provided with a timing means to initiate operation of said line searching circuit at uniform pre-determined intervals.

5. In a telephone call forwarding apparatus for a telephone installation at which there are at least two service lines to the central office, the combination comprising:

(a) a ringing signal detector coupled to a first of said service lines, (b) a dialing pulse generator coupled to a second of said service lines for transmitting a predetermined series of dialing pulses thereover to call a predetermined distant number thereon, said dialing pulse generator having electrical drive means actuated by said ringing signal detector, (c) a ring back detector coupled to said second line and detecting the ring back signals which are returned thereover following dialing of said distant number, said ring back detector having an output element which operates upon termination of said ring back signals, (d) a line connecting circuit coupling said first service line to said second service line, said line connecting circuit being coupled to said output element of said ring back detector and being actuated by operation thereof, and (e) means detecting termination of said call and actuating said line connecting circuit to uncouple said first and second service lines.

6. In an automatic telephone call forwarding device for a telephone installation at which there are at least two service lines to the central office, the combination comprising:

(a) a ringing signal detector coupled to a first of said service lines and having an output element which operates upon detection of ringing voltage on said first line, (b) a mechanism for generating any pre-selected series of dialing pulses on the second of said service lines whereby a pre-selected distant telephone number is called thereover, said mechanism having an electrical drive means coupled to said ringing signal detector and actuated by operation of said output element thereof, (c) a ring back detector coupled to said second service line and having an output element which operates upon termination of the ring back signals which are returned over said second line following dialing of said distant number thereover, (d) a switching circuit for coupling said first service line to said second service line, said switching circuit being coupled to said output element of said ring back detector and being actuated by operation thereof, (e) a line searching circuit coupled to said first service line and having means intermittently opening said first line whereby dial tone will be returned from the central office over said first line when the call has been completed, and (f) a dial tone detector coupled to one of said service lines and having an output element coupled to said switching circuit for decoupling said first and second service lines upon detecting dial tone following operation of said line searching circuit.

7. An automatic telephone call forwarding device as described in claim 6 wherein said line searching circuit (e) comprises a relay having contacts connected in series with said first line, means holding said relay contacts closed for a major portion of the time that said first and second lines are coupled, and a timing circuit momentarily opening said contacts while said first and second lines are coupled.

8. An automatic telephone call forwarding device as described in claim 6 wherein said switching circuit (d) is connected to the power supply thereof through a normally open switch means controlled by said output of said ring back detector (c) whereby said switching circuit operates to couple said lines only after termination of ring back signals and thus after said distant telephone has been answered.

9. An automatic telephone call forwarding device as described in claim 6 and comprising the further combination of an amplifier coupled to said second service line for amplifying signals thereon, said amplifier having a normally open switch means operated by the output thereof, said electrical drive means of said dialing mechanism (b) being connected to the power supply thereof through said amplifier switch means whereby said dialing mechanism operates only after dial tone is received on said second service line and amplified to operate said switch means thereby indicating that said second service line is in condition for dialing.

10. In an automatic telephone call forwarding device as described in claim 6, the further combination comprising first and second capacitively coupled terminating coils for said first and second service lines respectively, said switching circuit (d) having relay contacts connected in series with said first terminating coil and normally maintaining said first line disconnected therefrom and connected to a telephone instrument at said installation, and wherein operation of said output element of said ring back detector initiates switching of said relay contacts to connect said first line to said first terminating coil whereby said first and second lines are coupled only after said distant telephone has been answered.

11. A call diverter for use in conjunction with a telephone installation at which there is at least one telephone instrument and at least two service lines to the central office comprising:

(a) a first pair of terminals for connecting a first of said service lines to said diverter, (b) a second pair of terminals for connecting the second of said service lines to said diverter, (c) a third pair of terminals for connecting said telephone instrument to said diverter, (d) a fourth pair of terminals for connecting a power supply to said diverter, (e) first and second terminating impedances for said first and second lines respectively, said impedances being coupled for the transmission of audio signals therebetween, (f) a first switch means having a first position which couples said first pair of terminals to said third pair of terminals whereby said telephone instrument may receive calls on said first service line and having a second position decoupling said first pair of terminals from said third pair of terminals and coupling said first pair of terminals to said first terminating impedance, (g) a second switch means having a first position at which said second pair of terminals are decoupled from said second terminating impedance and having a second position coupling said second pair of terminals thereto, (h) a third switch means connected into said first line and having an open and a closed position, (i) a first signal detector coupled to said first pair of terminals and having an output element which is actuated upon detection of a ringing signal on said first line, said output element being coupled to operate said second switch means to said second position thereof whereby said second line is connected to said second terminating impedance and dial tone is received over said second line, (j) a signal amplifier coupled to said second terminating impedance and having an output element which is operated by amplified signals therefrom, (k) a dialing signal generator actuated by operation of said output element of said signal amplifier, said dialing signal generator being of the class which automatically produces a pre-selected series of dialing signals and being coupled to said second impedance, (l) means coupled to said second impedance for detecting an answered condition on said second line and having an output element operating said first switch means to said second position thereof upon detection of said condition whereby said first and second lines are coupled, (m) a timing means having an output element intermittently opening said third switch means, and (n) a disconnect circuit coupled to one of said impedances and having means for detecting dial tone signals, said circuit having an output element which operates on detection of said dial tone signals to restore said first and second switch means to said first positions thereof.

12. A call diverter as described in claim 11 wherein said means (l) coupled to said second impedance for detecting an answered condition of said second line comprises a second signal detector having means detecting the ring back signals which are returned over said second line following the sending of dialing signals thereover and means operating said first switch means (f) to couple said first and second lines following termination of said ring back signals.

13. A call diverter as described in claim 11 wherein said timing means (m) comprises a circuit element of the class having a conducting and a non-conducting state determined by a control voltage applied thereto, a timing circuit of the class periodically switching between first and second conditions and providing an output signal differentiating said conditions, means coupling said output signals of said timing circuit to said circuit element to provide said control voltage thereof whereby said circuit element periodically switches between said conducting and non-conducting states thereof, and means operating said third switch means (h) in response to changes of said circuit element between said conducting and non-conducting states.

14. A call diverter as described in claim 11 wherein said timing means (m) is provided with a control element requiring a sustained input voltage for initiating operation of said timing means, said control element being connected to said fourth pair of terminals to supply said input voltage through said output element of said signal amplifier (j) whereby said timing means operates only after the termination of repetitive operation of said signal amplifier output element from audio signals.

15. A call diverter as described in claim 11 wherein said third switch means (h) comprises a relay having contacts connected in series with said first terminating impedance and having a driver coil coupled to said output element of said timing means (m) and periodically energized thereby.

16. A call diverter for use in conjunction with a telephone installation at which there is at least one telephone instrument and at least two service lines to the central office comprising:

(a) a first pair of terminals for connecting a first of said service lines to said diverter, (b) a second pair of terminals for connecting the second of said service lines to said diverter, (c) a third pair of terminals for connecting said telephone instrument to said diverter, (d) a fourth pair of terminals for connecting a power supply to said diverter, (e) first and second terminating impedances for said first and second lines respectively, said impedances being coupled for transmission of audio signals therebetween, (f) a first switch means having a first position which couples said first pair of terminals to said third pair of terminals whereby said telephone instrument may receive calls on said first service line and having a second position decoupling said first pair of terminals from said third pair thereof and coupling said first pair of terminals to said first terminating impedance, (g) a second switch means having a first position at which said second pair of terminals are decoupled from said second terminating impedance and having a second position coupling said second pair of terminals thereto, (h) a first signal detector coupled to said first pair of terminals and having output means which is actuated upon detection of an incoming ringing signal on said first line, said output means being connected to operate said second switch means to said second position thereof whereby said second line is connected to said second terminating impedance, (i) a signal amplifier coupled to said second impedance and having an output element operated by amplified signals therefrom, (j) a dialing signal generator actuated by operation of said output element of said signal amplifier, said dialing signal generator being of the class which automatically produces a preselected series of dialing signals and being coupled to said second terminating impedance, (k) a second signal detector coupled to said second impedance and having an output element which operates upon the termination of ring back signals on said second line to switch said first switch means to said second position thereof whereby said first and second lines are coupled for audio signals through said coupled terminating impedances, and (l) means coupled to one of said impedances for detecting termination of a call and having an output element which is coupled to said first and second switch means to restore said switch means to said first positions thereof.

17. A call diverter as described in claim 16 wherein said output element of said second signal detector (k) is of the class operated by application of a pre-determined potential to a control element thereof and wherein said second signal detector comprises a first capacitor connected to said control element and connected between said fourth terminals whereby said capacitor may charge towards said pre-determined potential, a circuit element of the class having a conducting and non-conducting state coupled to said capacitor and controlling the charging thereof, and a monostable circuit having an input coupled to said second terminating impedance and having an output controlling the state of said circuit element, said monostable circuit being of the class which generates uniform output pulses following the receipt of input signals whereby ring back signals on said second line periodically render said circuit element conducting and prevent said first capacitor from charging to said predetermined potential until said ring back signals cease.

18. A call diverter as described in claim 17 wherein said monostable circuit is coupled to said second terminating impedance through a circuit for discriminating ring back signals from office connection pulses and the like, said discriminator circuit comprising a switch element operated by said output element of said signal amplifier (i), said switch element being open in the absence of signals on said second line and being closed when signals are present thereon, a second capacitor in series with an impedance coupled across said fourth terminals through said switch element of said amplifier whereby said second capacitor charges through said impedance when said switch element is closed by signals on said second line, said impedance paralleled by a diode such that said second capacitor discharges through said diode when said switch element of said signal amplifier is open thereby limiting the degree of charging of said second capacitor from brief closing of said switch element due to said office connection pulses and the like on said second line while allowing said second capacitor to charge to a high potential upon the sustained closing of said switch element due to a ring back signal thereon, and a circuit element of the class producing a pulse at an output thereof upon the application of a pre-determined potential to a control element thereof, said control element being coupled to said second capacitor and said output being coupled to said input of said monostable circuit such that said circuit element provides, at the output thereof, said input signals to said monostable circuit in response to periodic charging of said second capacitor to said high potential.

19. In an automatic call forwarding apparatus for use with at least two central office lines; and having means for detecting an incoming call on a first of said lines and means responsive thereto for signaling a preselected distant number over a second of said lines upon detection of an incoming call; and means for coupling said lines subsequent to operation of said signaling means such that said incoming call over said first line is forwarded as an outgoing call over said second line to said distant number; the combination comprising:

(a) means responsive to the coupling of said lines momentarily, at intervals, electrically interrupting said first line; and (b) means for decoupling said lines in response to an open line signal following operation of said electrical interrupting means.

20. An automatic call forwarding apparatus for use with at least two lines associated with a central office; and having means for detecting an incoming call on a first of said lines, means for signaling a pre-selected distant number over a second of said lines whereby ring-back signals are returned by said central office over said second line indicating that said distant number is ringing, means for coupling said lines, and means for decoupling said lines in response to termination of a forwarded call; the combination comprising:

(a) means detecting cessation of said ring-back signals on said second line; and (b) means responsive to said detecting means (a) and actuated thereby upon said cessation for actuating said coupling means.

References Cited

UNITED STATES PATENTS

| | | | |
|---|---|---|---|
| 1,279,841 | 9/1918 | Clausen | 179—18 |
| 1,344,195 | 6/1920 | Yanochowski | 179—18 |
| 1,349,381 | 8/1920 | Jacobsen | 179—18 |
| 2,031,692 | 2/1936 | Carson | 179—18 |

OTHER REFERENCES

Miller, K. B., Telephone Theory and Practice, Automatic Switching and Auxiliary Equipment, New York, McGraw-Hill, 1933, pp. 74–79.

KATHLEEN H. CLAFFY, *Primary Examiner.*

A. H. GESS, *Assistant Examiner.*

Dedication

3,409,741.—*Martin A. Odom*, Oakland, Calif. TELEPHONE CALL DIVERTER CONTROL CIRCUIT. Patent dated Nov. 5, 1968. Dedication filed, Jan. 3, 1972, by the assignee, *Ford Industries, Inc.*

Hereby dedicates to the Public the entire remaining term of said patent.

[*Official Gazette July 18, 1972.*]